(12) United States Patent
Bird

(10) Patent No.: US 6,318,055 B1
(45) Date of Patent: Nov. 20, 2001

(54) VERTICAL-AXIS MOWER AND ROLLER CONDITIONER

(76) Inventor: Ronald George Bird, Cubbaroo Station, Cloncurry, Queensland 4824 (AU)

( * ) Notice: Subject to any disclaimer, the term of this patent is extended or adjusted under 35 U.S.C. 154(b) by 0 days.

(21) Appl. No.: 09/308,073

(22) PCT Filed: Nov. 12, 1997

(86) PCT No.: PCT/AU97/00779

§ 371 Date: Jun. 28, 1999

§ 102(e) Date: Jun. 28, 1999

(87) PCT Pub. No.: WO98/20726

PCT Pub. Date: May 22, 1998

(30) Foreign Application Priority Data

Dec. 11, 1996 (AU) .................................................. PO3597

(51) Int. Cl.⁷ .......................... A01D 34/66; A01D 43/10; A01D 82/02

(52) U.S. Cl. ................... 56/6; 56/13.6; 56/255; 56/295

(58) Field of Search ............... 56/6, 295, 13.6, 56/265, 157, DIG. 20

(56) References Cited

U.S. PATENT DOCUMENTS

| | | | |
|---|---|---|---|
| 3,550,360 | * 12/1970 | Van Der Lely | 56/6 |
| 3,712,034 | * 1/1973 | Praca | 56/1 |
| 4,150,524 | * 4/1979 | Sawyer | 56/1 |
| 4,531,349 | * 7/1985 | Ehrhart et al. | 56/13.6 |
| 4,549,390 | * 10/1985 | McLean | 56/13.6 |
| 4,567,716 | * 2/1986 | Makofka et al. | 56/13.6 |
| 4,580,395 | * 4/1986 | Castoldi | 56/16.4 |
| 5,205,112 | * 4/1993 | Tillotson et al. | 56/6 |
| 5,404,695 | * 4/1995 | Gemelli | 56/6 |
| 5,842,330 | * 12/1998 | Richardson et al. | 56/6 |
| 5,884,461 | * 3/1999 | Ungruh et al. | 56/255 |

FOREIGN PATENT DOCUMENTS

2282216 * 4/1976 (FR) ...................................... 56/13.6

* cited by examiner

Primary Examiner—Robert E. Pezzuto
Assistant Examiner—Nathan Mammen
(74) Attorney, Agent, or Firm—Nath & Associates PLLC; Gary M. Nath; Marvin C. Berkowitz (57) ABSTRACT

Cutting apparatus (10) comprising a body assembly (11) including a lower wear disc (12) and an upper lifting and cutting assembly (13), mounted for driven rotation on a mower via driving hub (14). The lifting and cutting assembly (13) includes four blade assemblies (15) each comprising a pivoting angled blade (16) pivotally supported on lug (17) by bolt (20), located at the outer end of lifting means (21) comprising a curve walled portion (22) extending from a hub (23) and having an upper edge (24) which curves in a trailing direction out to the blade assembly (15 at 25). The cutting apparatus (10) forms a mower in assembly with a frame assembly (35) having mounted thereto a plane roller (36), a ribbed roller (37), describing therebetween a nip (40). The rollers are driven by train (41) adapted to be engaged by the PTO of a vehicle. Ribbed roller (37) has a plurality of substantially evenly spaced ribs each extending between the ends of the roller and curving back about the cylindrical roller surface to a mid point disposed in trailing relation relative to the rib ends. Each rib declines at an angle of 25 degrees to the longitudinal axis of the roller.

16 Claims, 14 Drawing Sheets

VERTICAL-AXIS MOWER AND ROLLER CONDITIONER

BACKGROUND OF THE INVENTION

This invention relates to rotary cutter apparatus.

This invention has particular but not exclusive application to rotary cutter apparatus suitable for use in tractor drawn hay-making mower apparatus, and for illustrative purposes reference will be made to such application. However, it is to be understood that this invention could be used in other applications, such as maintenance mower apparatus.

Mowers are used for the cutting of grass and crops for fodder such as hay and silage. In general, the standing green crop is cut about 25 mm to about 150 mm above ground level by tractor drawn mowing apparatus. Once cut, the crop is generally conditioned. This is achieved in one method by being fed between rotating rollers of about 200 mm to about 300 mm in diameter for conditioning by bruising.

Alternatively the cut feed is conditioned between spoke conditioning flails, forage blower or cutter and blower. The cut and conditioned material is generally deposited on the ground in windrows.

The present mowers may include from four to six cutting apparatus comprising rotating discs with two to three cutting knives per disc, of 400 mm to 500 mm diameter, and mounted on a floating bar that rests on the ground when working. Alternatively, there is provided apparatus comprising pairs of counter-rotating discs of about 600 mm to about 1200 mm diameter bearing about 3 to about 5 cutting blades per disc.

The present type mowers require the use of high speed rotating cutting discs to cut and lift the crop and to feed the cut crop through conditioning means. Whilst the speeds currently in use are in excess of the speed required for cutting, lower speeds do not provide sufficient lift to feed the cut material to the conditioning apparatus. In an attempt to improve the lifting capacity for a given speed it has been proposed to provide the cutting discs with lifting means such as radial bars in the form of pressed ribs or welded bar or angle iron, oval-shaped discs or the like. To date, none have been effective in providing sufficient lift at relatively low disc speeds.

Notwithstanding the use of high speed discs with the aforedescribed lift improving means, present apparatus cannot achieve a consistent flow of grass and other crop types from the cutting discs to the conditioning means. The high speed cutting knives have tip speeds of 250 to 300 kph and this combined with the shape of the discs requires an excessive amount of power to maintain cutting and lifting of the crop to the conditioning means. Existing apparatus also has difficulty in mowing the headlands of standing crops without mincing the crop, which downgrades the hay quality and reduces the quantity recoverable.

The high speed of the existing cutting discs has the further disadvantage of picking up foreign objects such as rocks, stones, timber, sticks and metal objects, which are propelled at considerable speed either into the conditioning means or out of the apparatus altogether, such high speed projectiles being dangerous to operators and others.

The present invention aims to substantially alleviate at least one of the above disadvantages and to provide mower apparatus which will be reliable and efficient in use. Other objects and advantages of this invention will hereinafter become apparent.

SUMMARY OF THE INVENTION

With the foregoing and other objects in view, this invention in one aspect resides broadly in vertical-axis mower and conditioner apparatus including:

a chassis adapted to be moved over a crop to be mown;

a plurality of rotary cutter assemblies disposed across said chassis and each comprising a substantially circular body member supported for driven vertical-axis rotation on said chassis and a cutting member disposed peripherally of said body member; and conditioning apparatus adapted to accept crop cut by said cutter assemblies, characterised in that said rotary cutter assemblies are arranged in counterrotating pairs with overlapping cutting arcs, the nip of said counterrotating pairs being toward the direction of travel, said body member having an upper portion adapted to receive cut crop by virtue of the motion of the chassis in the direction of travel through the crop, said upper portion having crop lifting means comprising a leading wall portion extending outwardly on said body member from a substantially radially directed inner end towards said periphery and curved in a trailing direction to a substantially circumferentially directed outer end, having an upper edge spaced from a plane of travel of said cutting member, and a trailing land portion extending from said upper edge towards said plane.

The cutting assembly preferably forms part of a mower apparatus comprising a plurality of cutter assemblies. The cutter assemblies are preferably disposed in counter-rotating adjacent positions in the mower apparatus. The cutting members of the adjacent cutter assemblies are preferably disposed such that the swept areas of the cutter means are overlapping.

The body member is preferably supported for rotation about a substantially vertical axis such that the cutter means sweeps in a substantially horizontal plane. The body member may be rotated by any suitable means such as a power take off from a tractor or the like, or the apparatus may be self propelled.

The cutting member may comprise one or more rigidly mounted or centrifugally deployed blade means disposed about the periphery of the body member. The blade or blades may be substantially planar or may be contoured to assist in delivering the cut crop from the mower apparatus or to conditioning means. Preferably, the blades are inclined such that the leading edge is lower than the trailing edge to contribute to lifting of the cut crop.

The lifting means are preferably disposed in multiples about a substantially circular body member. The lifting means may take any suitable form. For example, the lifting means may include one of more leading wall portions helically disposed such that their solid of rotation is a broad, short cone.

Alternatively, the lifting means may comprise one or more leading wall portions extending substantially radially at their inner end but curving out towards the periphery in a trailing direction, such that the outer end is behind the point on the circumference described by the initial radial direction. Preferably, the curve of the wall portions and the number of lifting means is selected such that the angular displacement of the outer end of the wall portion is substantially equal to 360° divided by the number of lifting means. However, it is also envisaged that the lifting means may be spaced or overlapping by a significant departure from this even division.

Preferably, the apparatus is provided with four lifting means distributed evenly about the body member.

The upper edge of the wall portions are preferably spaced from a plane of travel of the cutting member in either a parallel or inclined manner. It is preferred that the upper edge extend substantially from the axial region of the body member to the periphery. However, it is envisaged that the upper edge may fall considerable short of either or both of these extremes.

The trailing land portion preferably extends as a smooth surface from the upper edge towards the plane of the cutting means to terminate at the foot of an adjacent wall portion. However, it is envisaged that the surface may be other that smooth and may for example terminate in a substantially planar region extending to the next wall portion. Further, in the case of the helically disposed walls of the embodiment describing a cone as a solid of rotation, the lands may, after being inclined towards the plane of the cutting means, meet a surface which inclines away from the plane, which surface meets the foot of the wall portion higher on the conical form.

The cutter apparatus may be of any suitable material. Preferably, the body portion is formed of mild steel for ease of fabrication, cheapness and strength. The lifting means may be pressed formed or fabricated integrally with the body member, or may be assembled thereto. The assembled lifting means may comprise for example steel, hard rubber or plastics material such as TEFLON or NYLON that may be bolted to the body member.

For hay mowing apparatus it is desirable to combine the mowing apparatus with conditioning apparatus such that a common drive is used to provide a continuous mowing and conditioning process. Conditioning apparatus includes the aforementioned conditioning flails and rollers. Conditioning rollers are generally preferred for robustness, limited maintenance requirements, resistance to fouling and consistent bruising of the cut crop without mashing.

In a further aspect, this invention resides in crop conditioning apparatus of the type including:

a supporting body;

conditioning rollers mounted on said body presenting a nip to receive cut feed, and drive means for said rollers, wherein said rollers comprise at least one roller with a plurality of substantially evenly spaced ribs each extending between the ends of the roller and curving about the cylindrical roller surface to a mid point disposed in trailing relation relative to the rib ends.

The supporting body is preferably adapted to be mounted to a mower or the like to be drawn together therewith. The body may be wholly supported by the mower or may be hitched thereto and supported on its own wheels.

The supporting body may be provided with mounting means to support one or more pairs of conditioning rollers. For example, the apparatus may support a pair of conditioning rollers being mounted on horizontal axes. Preferably, the horizontally mounted rollers are mounted with their axes contained in an inclined plane such that the receiving side of the nip may accept the upwardly lifted cut crop from the mower into the nip of the rollers and deliver the conditioned crop in a direction having an upward component.

The rollers may be of any suitable material and are advantageously of a somewhat resilient material such as hard rubber or the like. Alternatively one or the other of the rollers may be of durable material such as steel. The rollers are preferably driven via the power take off of the tractor or the like drawing the mower. However, if desired the conditioning apparatus may be self propelled or the rollers driven by the supporting wheels.

The ribs of the at least one ribbed roller may take any suitable form consistent with the function of co-acting with its adjacent roller to condition the crop. Preferably, the ribbed roller or rollers comprise a tube or rolled section of steel or other material provided with supporting axle and bearing means. On the outer cylindrical surface there is provided evenly spaced ribs, typically comprising square steel bars of about 20 mm×20 mm section at a rib spacing of about 50 mm around the roller. The declination of the ribs about the from the centre to the ends of the roller in the direction of rotation is typically maintained at an angle of about 25 degrees to a line on the roller parallel to the roller axis at the point of measurement and follows the curve of the roller to each end. In the middle of the roller the ribs may be substantially parallel with the axis of the roller for about 300 mm for a typical roller of about 1 meter length.

The other roller is preferably plain and may be of any suitable material. Preferably the roller is a steel carcass having an outer cover of resilient material such as fibre reinforced rubber, typically of a thickness between 20 mm to 60 mm. Alternatively, the other roller may also be ribbed as per the first mentioned roller, provided that the ribs of the respective rollers do not mesh. In such apparatus, the roller may comprise a moulded rubber compound outer layer of typically 20 to 60 mm thickness with ribs moulded into its surface.

BRIEF DESCRIPTION OF THE DRAWINGS

In order that this invention may be more readily understood and put into practical effect, reference will now be made to the accompanying drawings which illustrate a preferred embodiment of the invention and wherein.

DETAILED DESCRIPTION OF THE PREFERRED EMBODIMENTS

Figure 1:
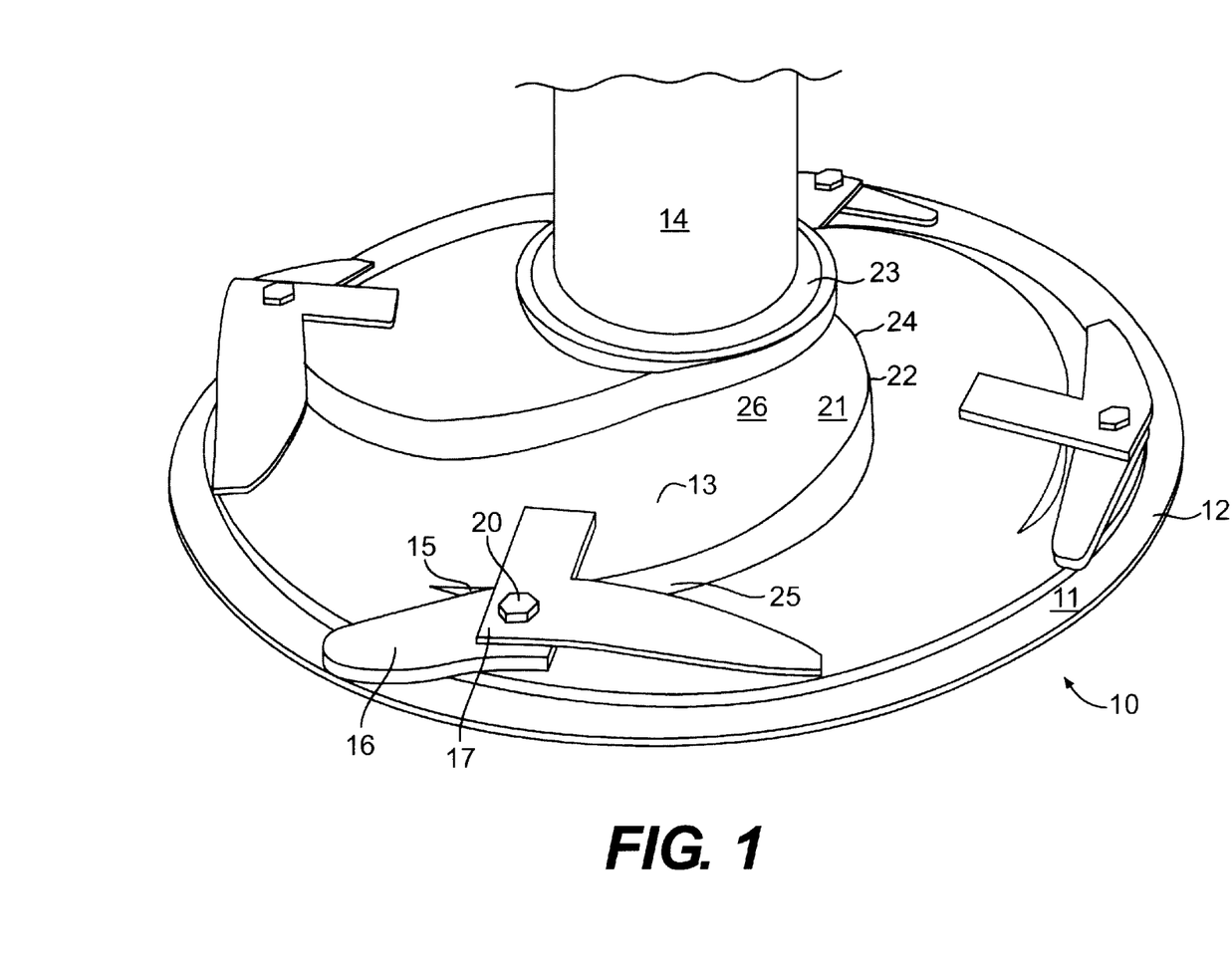
FIG. 1 is a perspective view of cutter apparatus in accordance with the present invention.

In FIG. 1 there is provided cutting apparatus 10 comprising a body assembly 11 including a lower wear disc 12 and an upper lifting and cutting assembly 13.

The lower plate 12 and the lifting and cutting assembly 13 are mounted for driven rotation on a mower via driving hub 14.

The lifting and cutting assembly 13 includes four blade assemblies 15 each comprising a pivoting angled blade 16 pivotally supported on lug 17 by bolt 20.

The blade assembly 15 is located at the outer end of lifting means 21 comprising a curve walled portion 22 extending from a hub 23 and having an upper edge 24 which curves in a trailing direction out to the blade assembly 15 at 25.

The upper trailing surface 26 of the lifting means 21 extends downwardly and outwardly to the outer periphery of the lifting and cutting apparatus 13 and further extends downwardly and in a trailing direction to meet the foot of the wall portion 22 of the adjacent lifting means next following.

Figure 2:
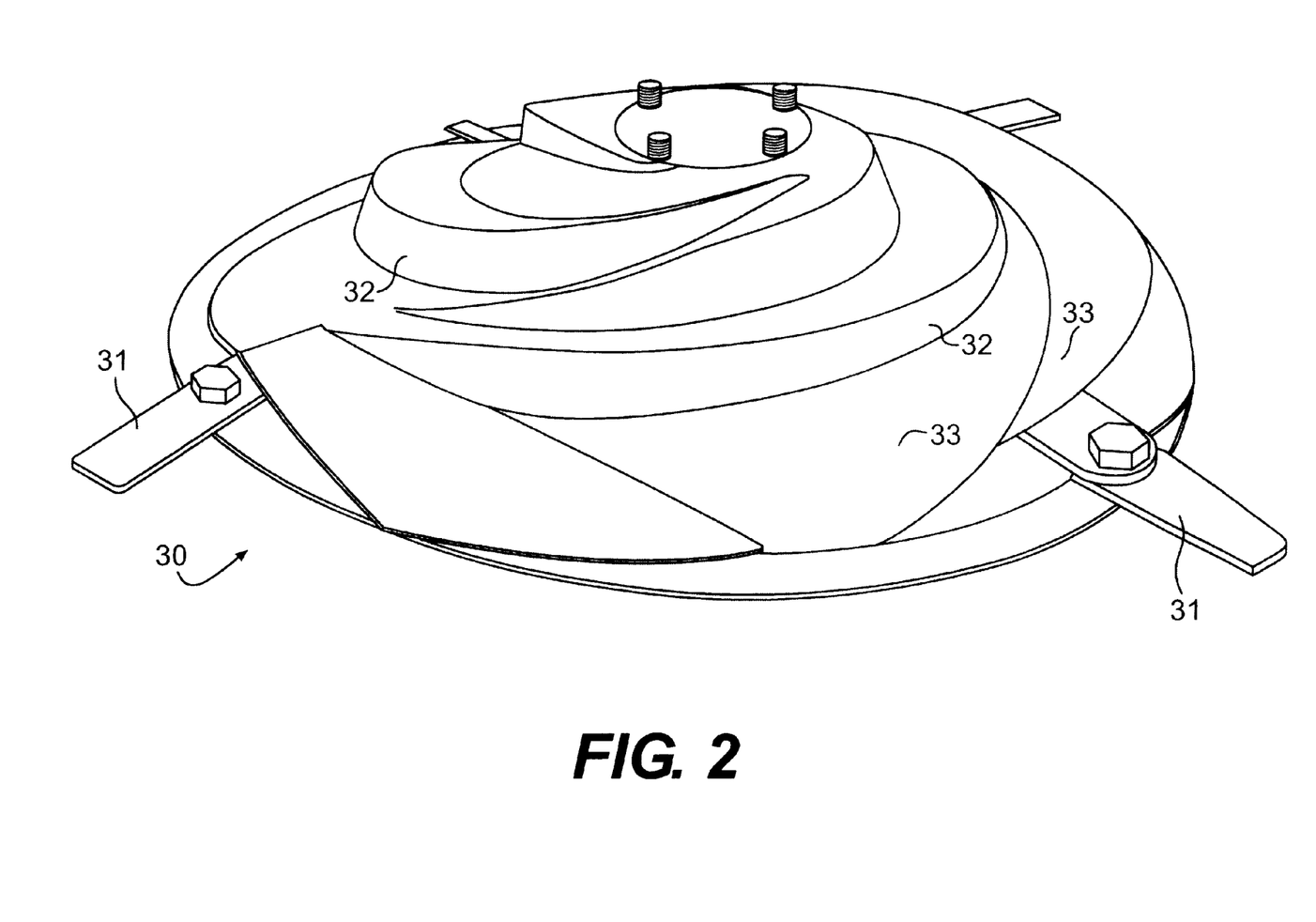
FIG. 2 is an alternative embodiment of cutting apparatus in accordance with the present invention.

In the embodiment illustrated in FIG. 2, there is provided a cutter assembly 30 of broad conical form having disposed about its periphery, four cutting blades 31, mounted as per the previous embodiment. Integrally formed into the conical surface are helical wall portions 32 of generally spiral form up the conical surface and separated by helical lands 33, in this embodiment in the form of V-shaped channels separating the wall portions 32.

Figure 3:
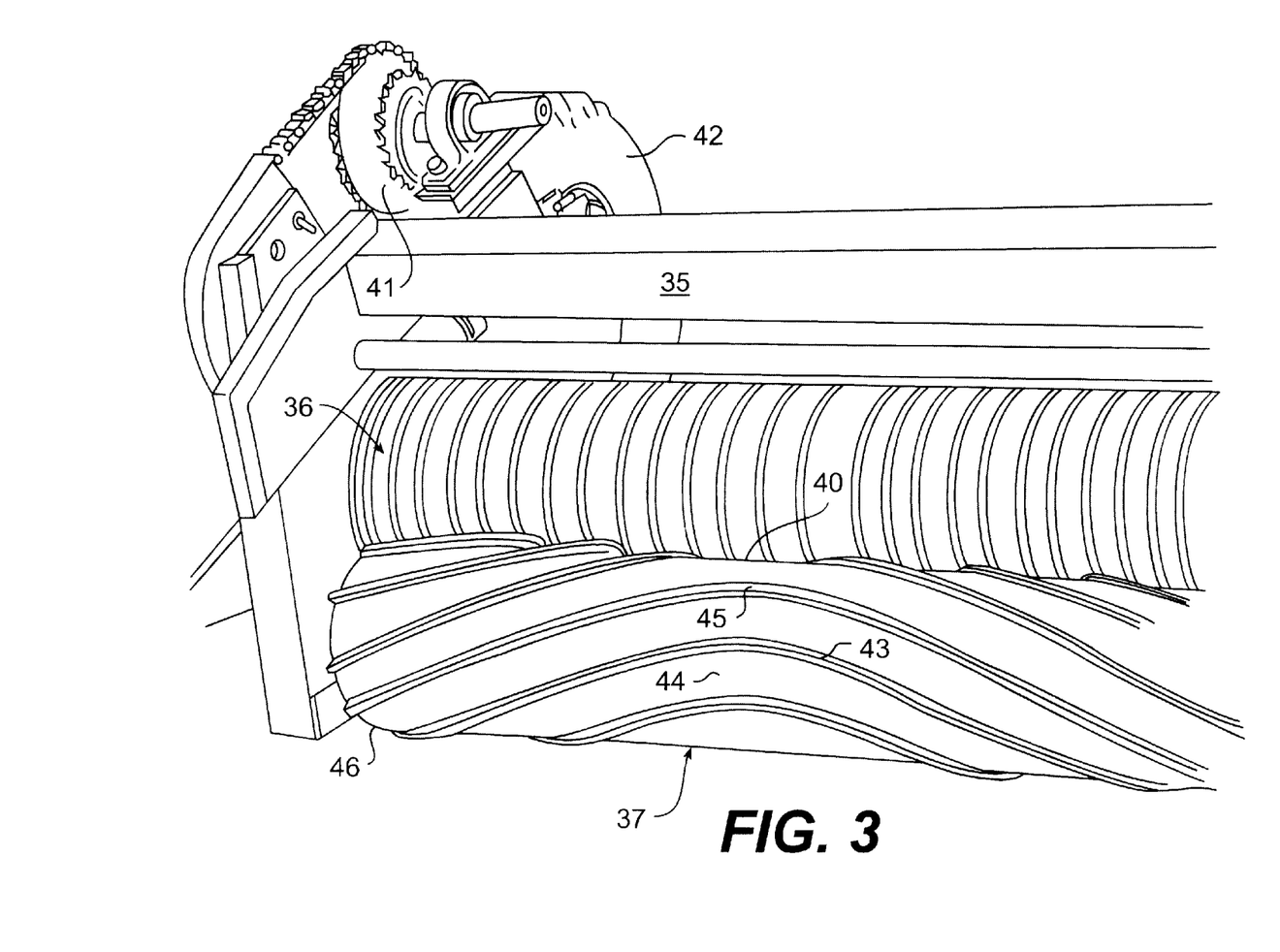
FIG. 3 is a perspective view of conditioning apparatus suitable for use in conjunction with apparatus of the present invention.

The conditioning apparatus of FIG. 3 includes a frame assembly 35 having mounted thereto a plane roller 36, a ribbed roller 37, describing therebetween a nip 40. The rollers are driven by drive train 41 adapted to be engaged by the PTO of a vehicle. Wheels 42 support the apparatus in hitched engagement with a tractor drawn mower.

The ribbed roller 37 is provided with a plurality of curved ribs 43 spaced by grooves 44. The ribs 43 have a mid-point 45 which is trailing relative to the rib ends 46.

Figure 4:
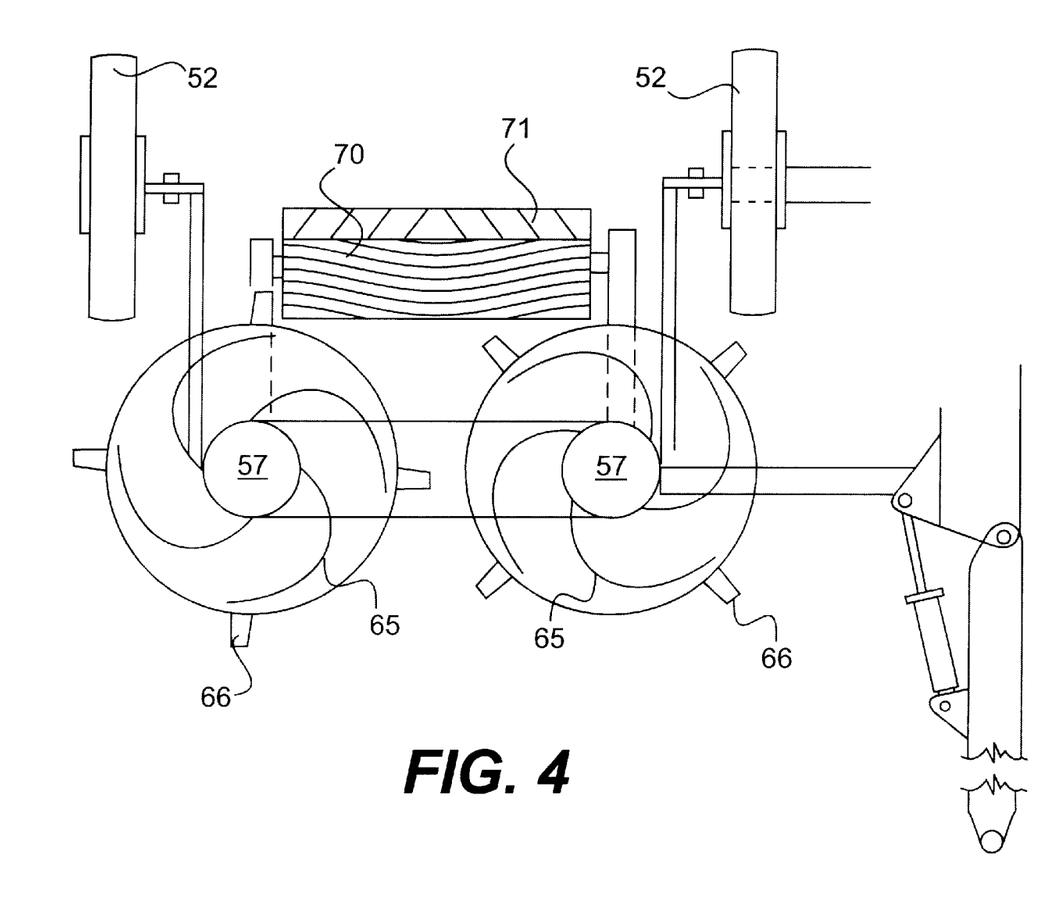
FIG. 4 is a plan view of apparatus in accordance with the present invention.
Figure 5:
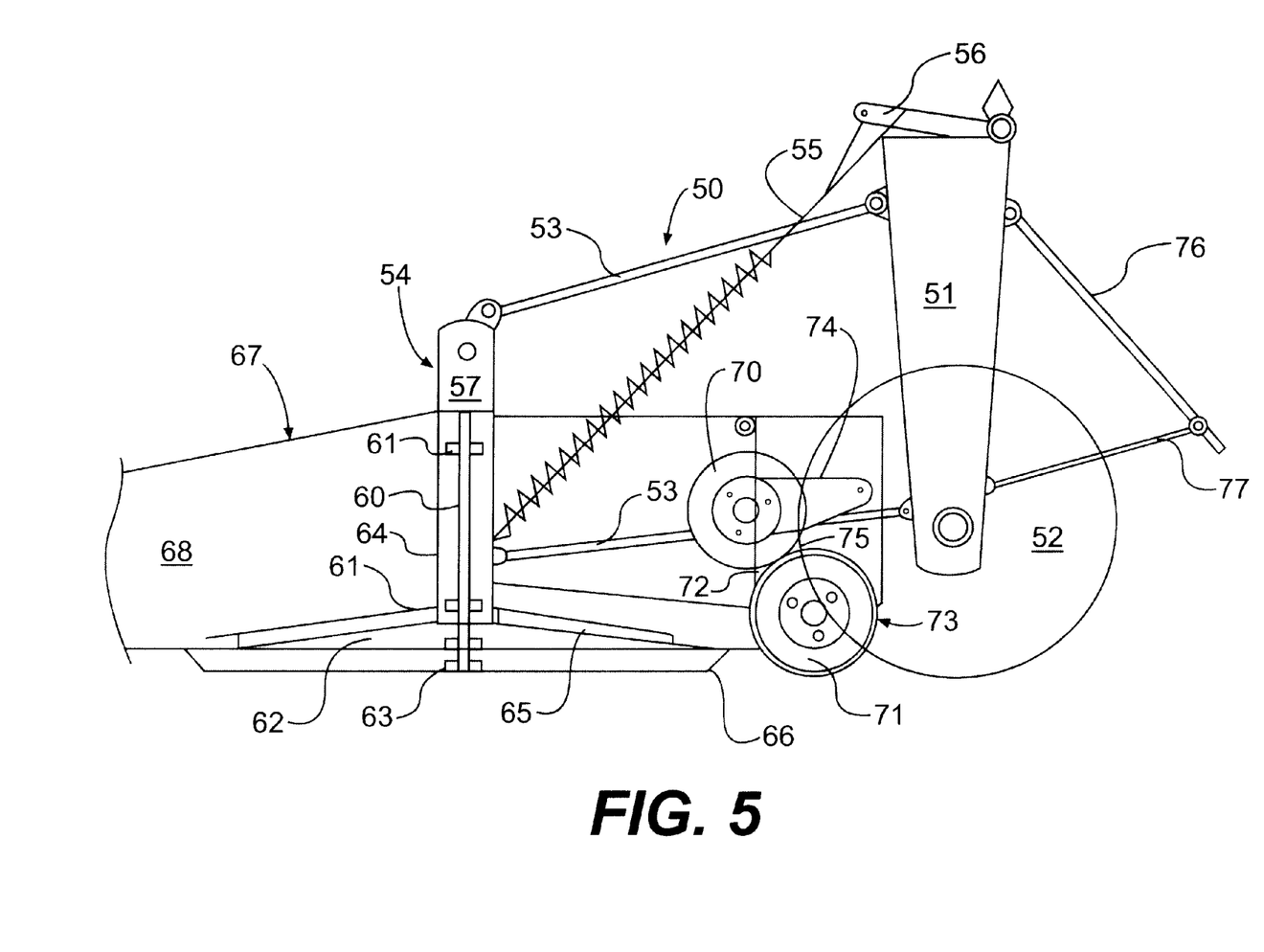
FIG. 5 is an elevation of the apparatus of FIG. 4.

In the apparatus illustrated in FIGS. 4 and 5 there is provided a mower assembly 50 including a chassis 51 supported by wheels 52. Mounted to the chassis 51 by parallel arms 53 is a cutter assembly. The movement between the chassis 51 and the cutter assembly 54 for raising and lowering of the latter is effected by a spring-loaded lift assembly 55 operated by lifter lever 56 mounted to the chassis 51.

The cutter assembly 54 includes a gearbox 57 adapted to be driven by the vehicle PTO and driving shaft 60 through bearing assembly 61 to cause rotation of a cutting disk 62. The cutting disk 62 is mounted above a skid plate 63 supported on a stationary housing 64 through which the drive shaft 60 extends.

The cutting disk 62 is provided with lifting means 65 and supports at it periphery cutting blades 66.

The operator of the apparatus is protected by the provision of an impact resisting cover member 67 and a flexible cover member 68 disposed on the apparatus towards the tractor drawing the apparatus.

Behind the cutting assembly 54 is locating conditioning means comprising an upper 70 and lower 71 conditioning rollers meeting at a nip 72, the upper roller 70 comprising steel ribs as hereinbefore described with the lower roller 71 having an outer sleeve 73 of rubber composition. The upper roller 70 is driven by chain drive 74 driven off the vehicle PTO. The discharge side 75 of the conditioning roller 70, 71 directs conditioned and cut crop outwardly and upwardly to the rear of the apparatus whereupon it is deflected to the ground by adjustable rear cutter means 76 supported on strut 77.

Figure 6:
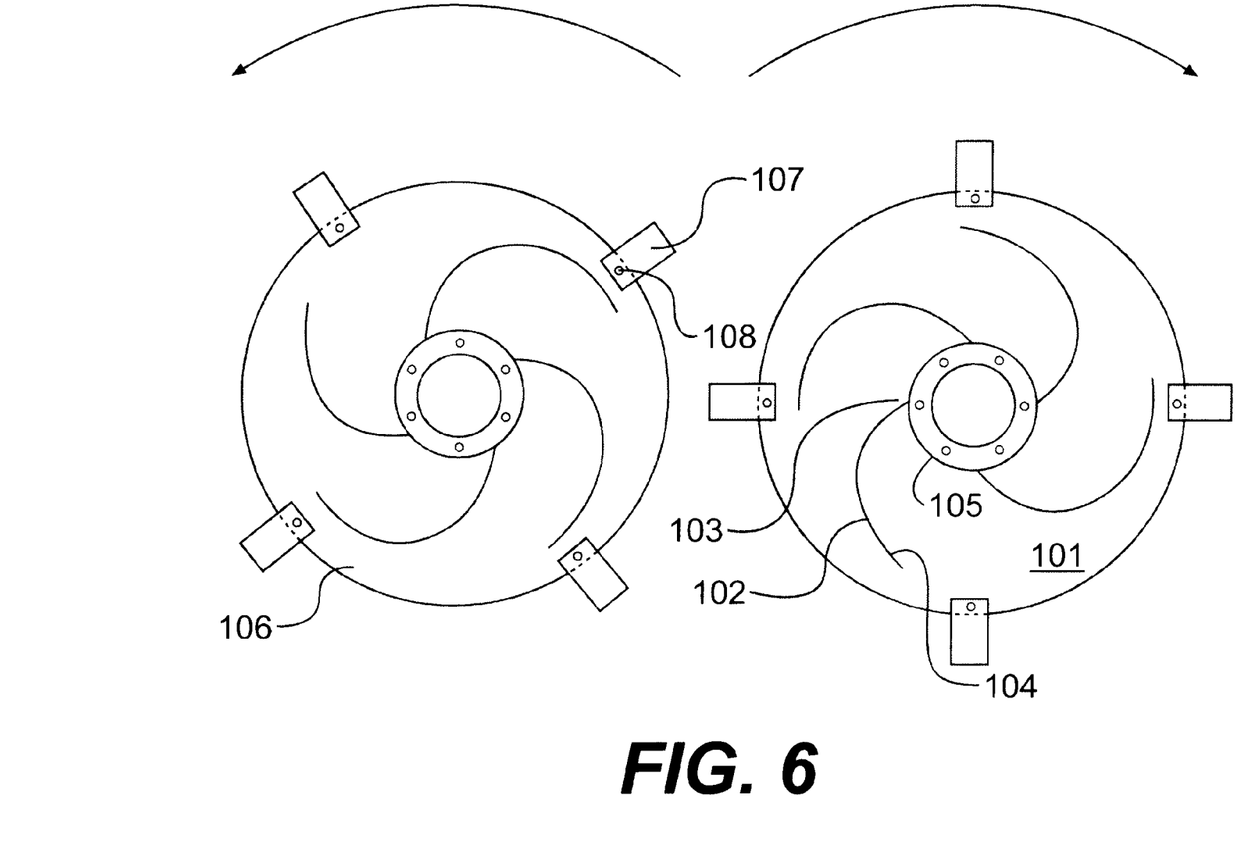
FIGS. 6 to 12 illustrate the detail of the apparatus of FIGS. 1 to 5.
Figure 7A:
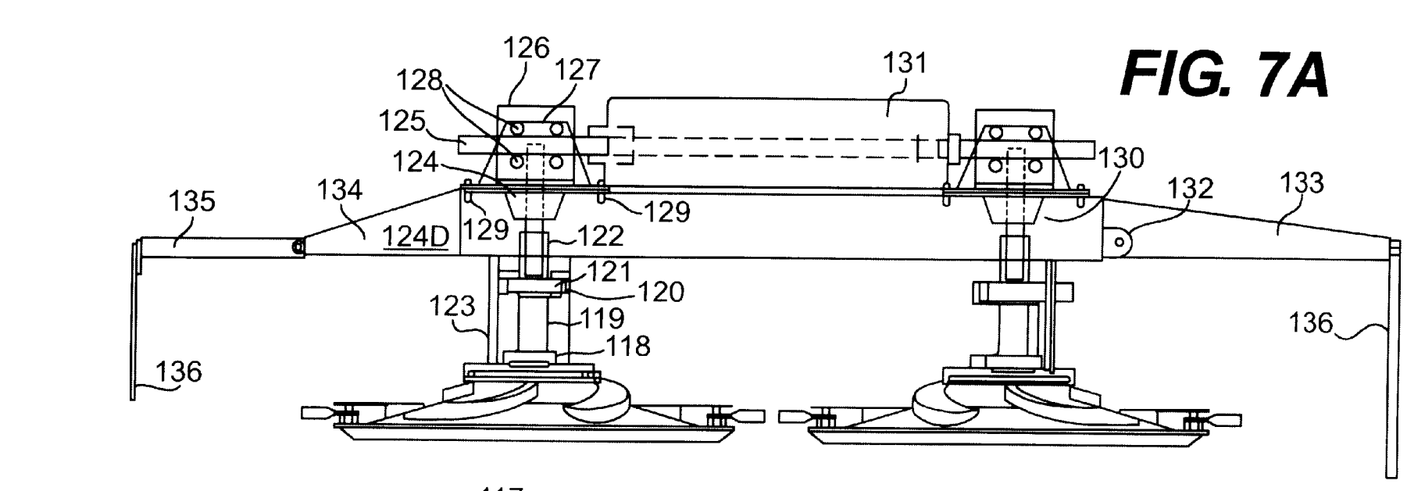
Figure 7B:
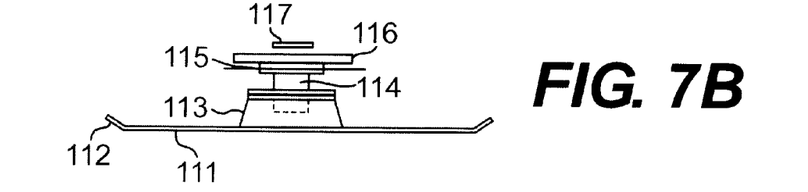
Figure 7C:
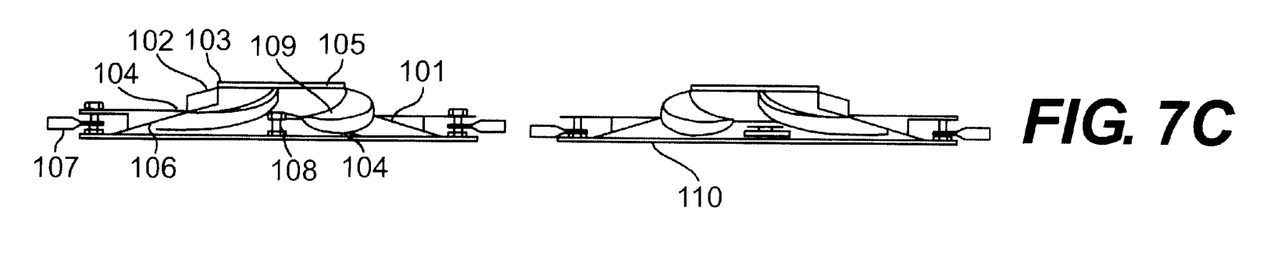
Figures 8A, 8B:
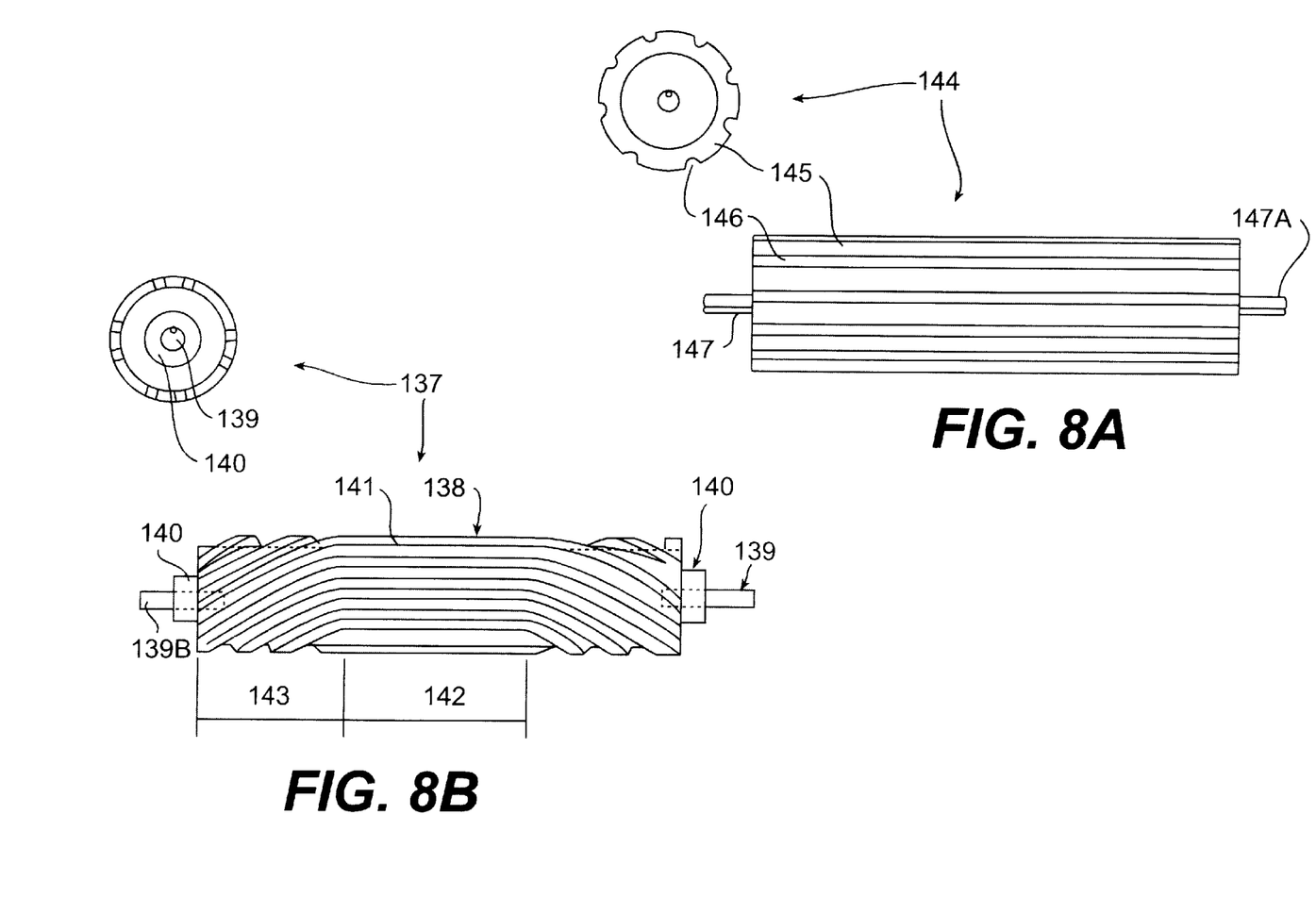
Figure 9:
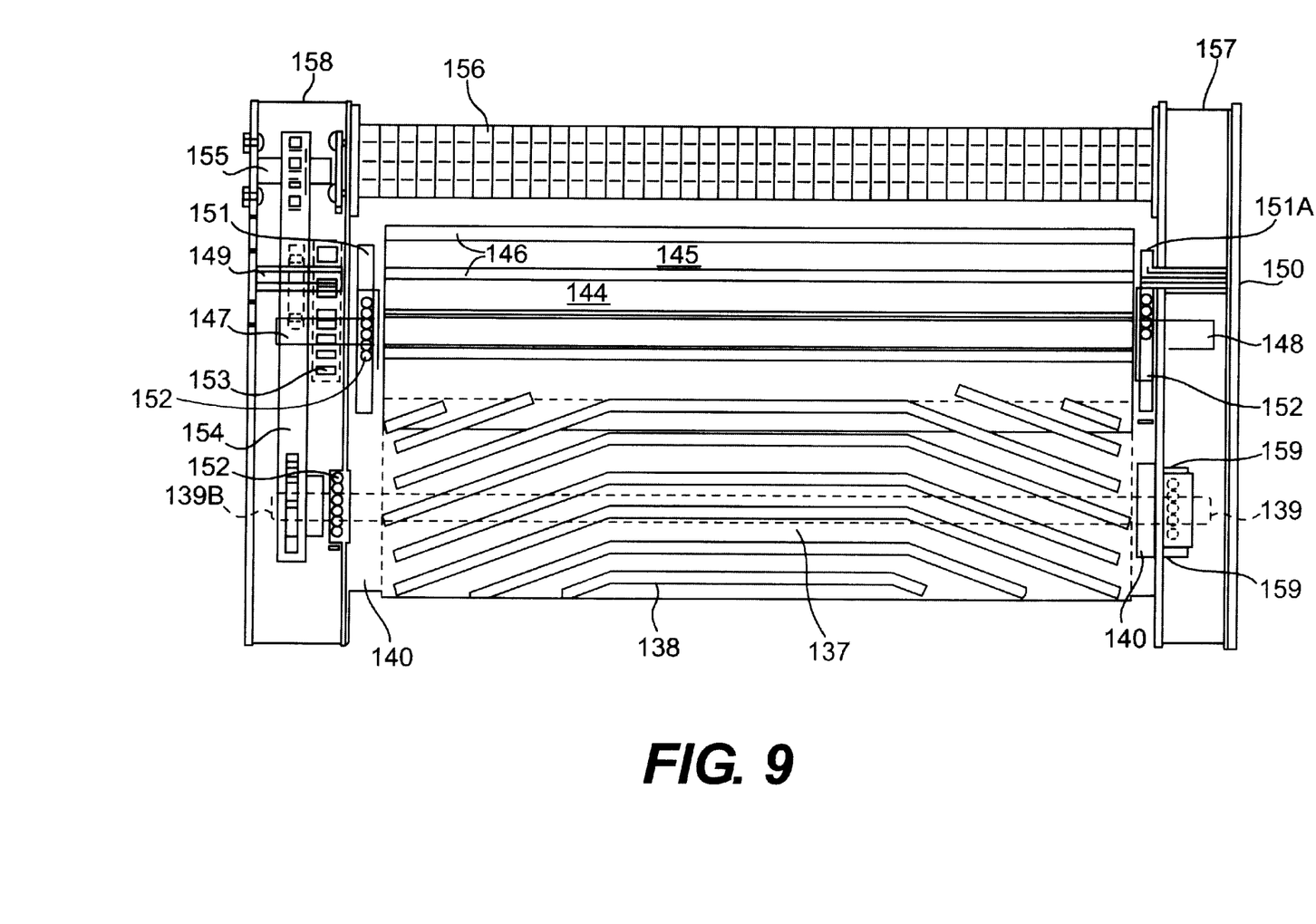
Figure 10A:
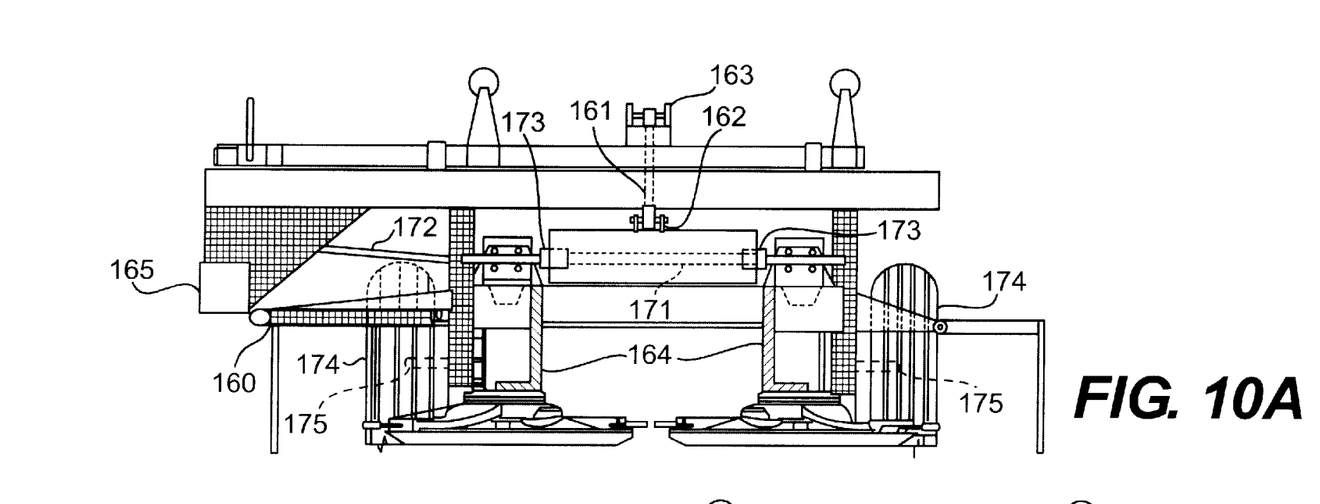
Figure 10B:
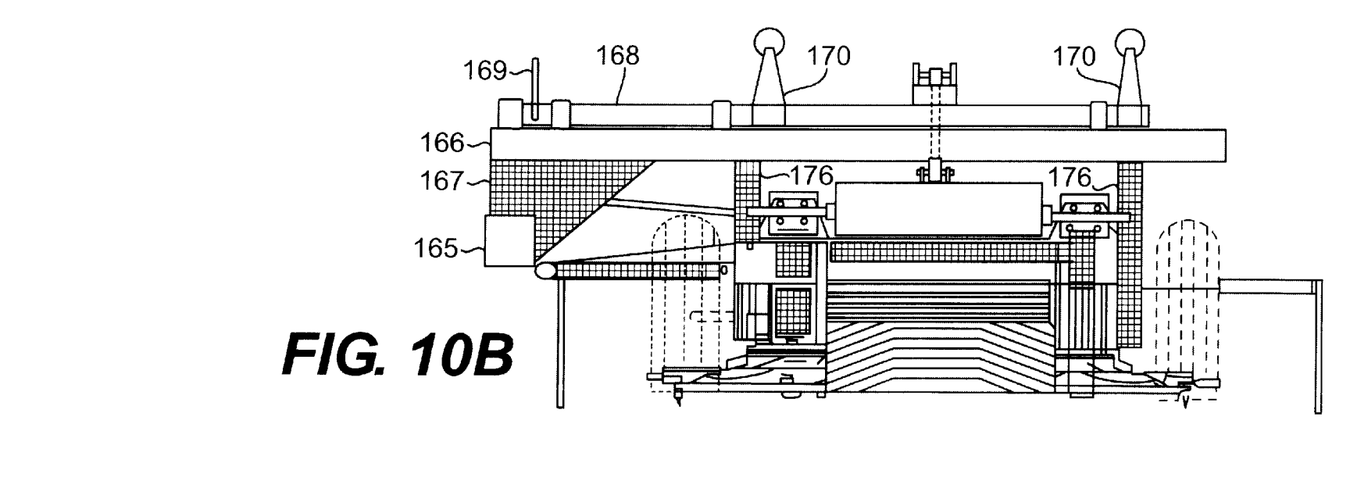
Figure 11A:
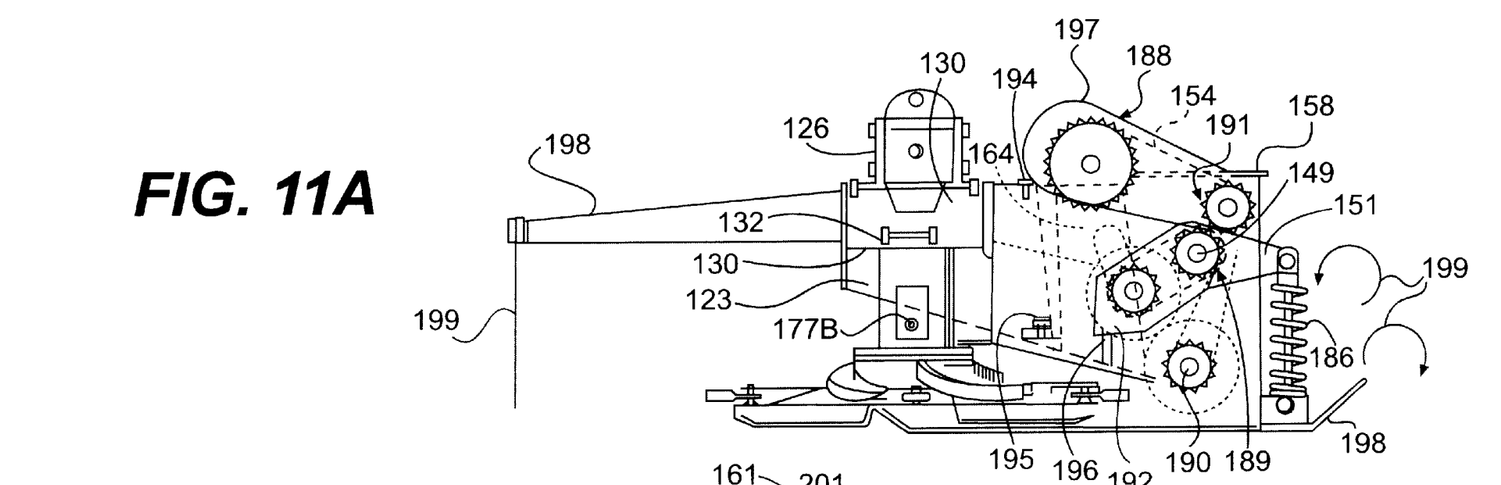
Figure 11B:
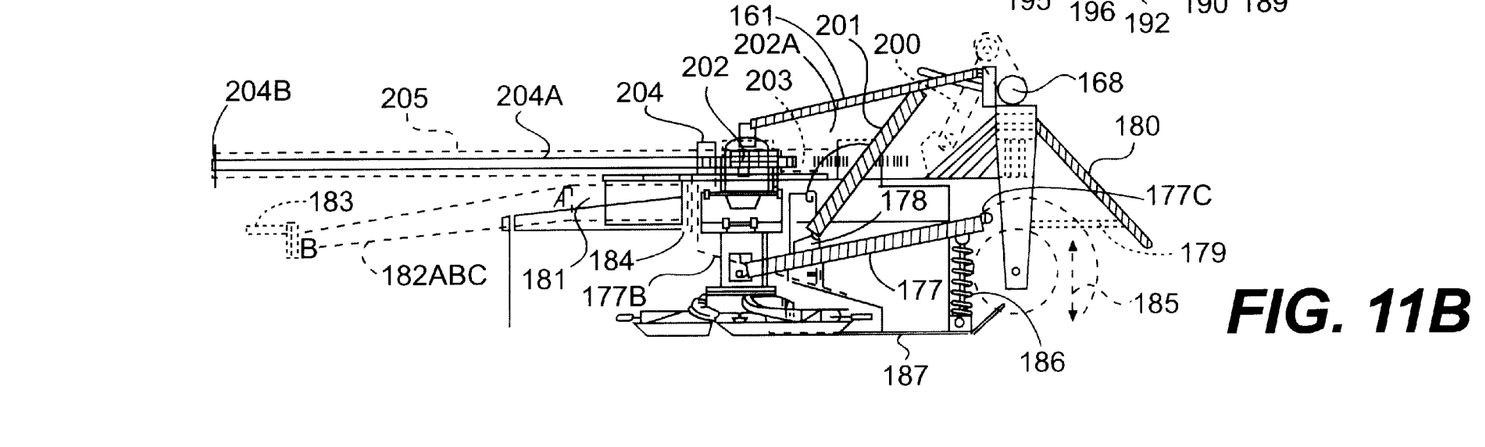
Figure 12:
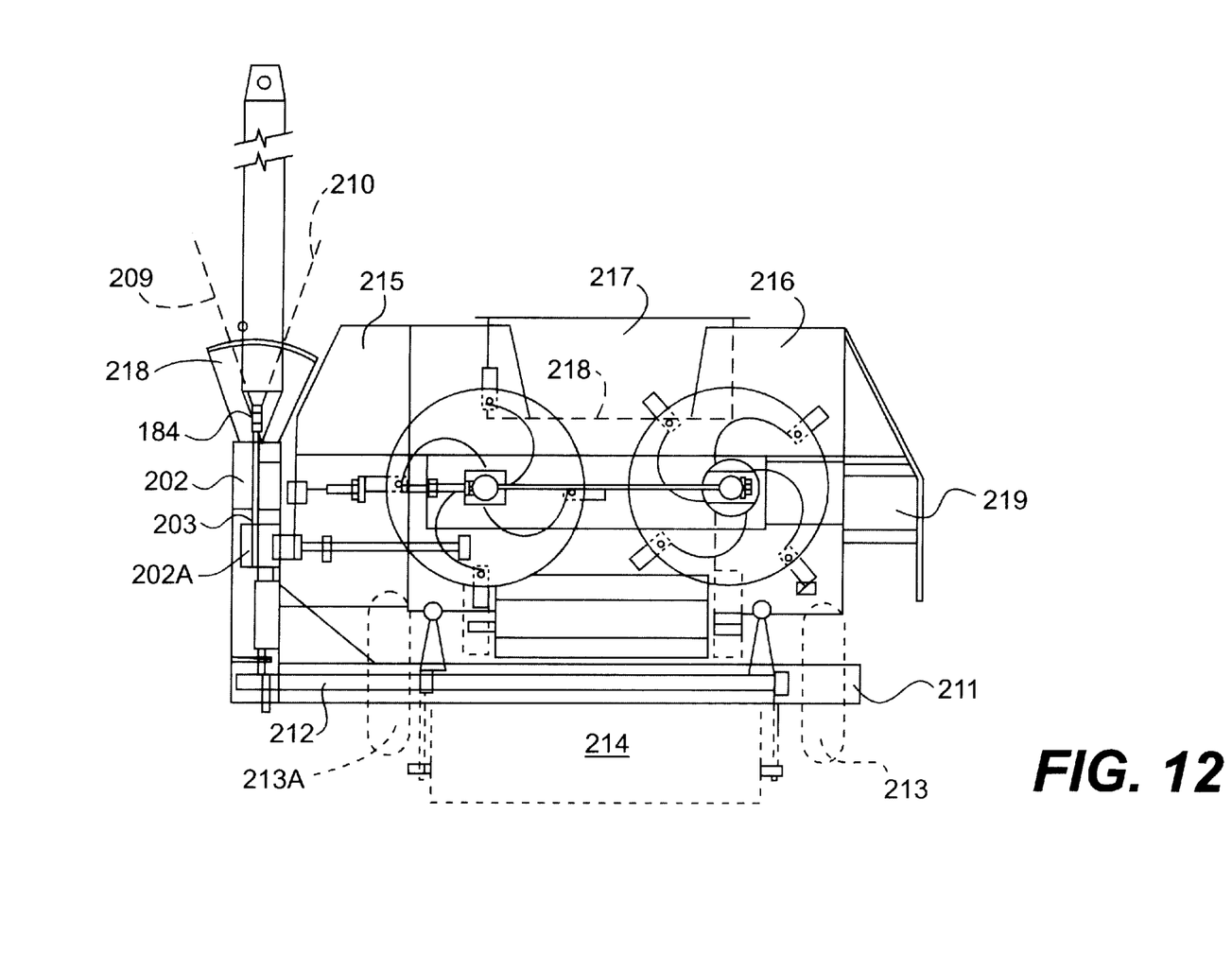

In the embodiment illustrated in FIG. 6 power feed discs 101 rotate clockwise and anti-clockwise respectively, each having four (4) ribs 102 50 mm high extending from a connecting point 103 at the inner portion of the disc to an outer point 104 of the disc near the periphery. The disc has an inner centre top plate 105 welded to the disc and having 6 bolt holes. The ribs are each fabricated to a lifting plate 106 to lift grass. Each disc bears four cutting knives 107 each being twisted to present 15 degrees down on its leading edge, and secured to the disc edge by a bolt 108.

The back side of ribs 109 give strength with light weight and a working edge, sloping back at 10 degrees to main disc and allowing grass material to slide onto the leading edge of the following disc. A flat base 110 of the outer edge of the disc and flat base 111 of a skid plate under the rotating discs cooperate to skim over the cut grass close to the cut, the outer edge 112 being bent up at 20 degrees.

The inner centre 113 of the base plate connects to the bearing hub by 6×12 mm×35 mm bolts. The base plate bearing outer hub 114 has a seal retainer 115 on the main drive shaft, and a plate 116 connects to the discs. Strengthening backing 117 is provided for the plate on the main shaft, which is supported on a bottom bearing 118. A centre spacer 119 is provided to keep the bearings apart. A circlip 120 prevents the main shaft moving on the bearings.

A top bearing 121 is provided on the main shaft. A connecting top collar 122 is splined to the 6-spline main shaft and to the gear box 126 six-spline output shaft 124. An outer stationary tube 123 mounted to the mower chassis extends down to the disc to protect the rotating shaft from being wrapped. The gearbox 126 has an input shaft 125 mounted at 90° to the output shaft 124. The gearboxes 126 are supported by respective pairs of chassis plate brackets 127 via bolt holes 128 and bolts 129.

The chassis box frame 130 has a cover 131 over a power take off shaft between the gear boxes 126. The chassis box frame has a connecting bracket 132 enabling connection to the towing chassis via a side control arm. A protecting cover 133 over discs near towing chassis provides protection, as does protecting cover 134 from the mower chassis to outer folding cover 135, which can fold up for travelling when not working. A rubber protective apron 136 also protects against projectiles.

A bottom roller 137 is mounted to the chassis and includes ribs 138 ribs of 20 mm×20 mm solid steel. The bottom roller 137 is mounted on a centre shaft 139 of 38 mm diameter, and a drive end centre shaft 139B. Outer collars 140 retain the respective shafts in position.

The ribs 138 are spaced by and define channels 141 between the ribs of 40 mm dimension. At 142 the ribs are parallel to the roller for 300 mm. At 143 the ribs curved around roller at 20 degrees to the axis.

The top roller 144 has a poly rubber covering 145 with eight ½ moon indent scallops 146, and is mounted for rotation on a non driven 148 and driven 147 centre shafts of 38 mm diameter. A driving shaft 149 carries two chain sprockets and is located coaxially with the pivot point of top roller bearing plate. A shaft 150 carries the pivot point bearing plate to the top roller, a top roller guide 151 and bearing retainer plates 151A locating each end of the rollers mounted on bearings 152. Roller sprockets 153 are engaged by drive chains 154 of 19 mm size via an idler sprocket and shaft 155.

A top chassis bar 156 of 75 mm×75 mm with welded plates each end bolts to the non drive end chassis 157 and the drive end chassis 158 respectively.

Bottom roller bearings are retained by bearing retainers 159.

Side control arms 160 are provided between the towing chassis and the mower chassis, and an adjustable top arm 161 locates between the wheel chassis and the cover over the PTO between the gear boxes via a bracket attachment point 162 with bolt through, and corresponding bracket attachment point 163 with bolt through to connect top arm to wheel chassis.

Attachment plates 164 support the conditioning roller chassis on the inside of both disc chassis tubes 123 and 130.

The towing bar chassis 165 is welded to the wheel chassis at back of mower via welded plate 166 and step 167. A lifting load bar 168 is located at a height central of the apparatus and is operable by a cam lever 169 for a hydraulic ram. Further cam levers 170 on the lift load bar 168 connect to springs to lift the mower chassis. The position of the PTO shaft between the gearboxes is shown at 171. The PTO shaft 172 from right angle gear box on towing chassis to first mower gear also being shown. A collar 173 connects the gear box through shafts to PTO shaft between the gear boxes.

A pair of pneumatic tyres on wheels 174 support the apparatus on stub axles 175, via a frame 176 from wheel chassis to stub axles and lower connecting push arms and back tail gate. A bottom push arm 177A is disposed each side of the tubes about the disc shafts via bottom arm connecting plate and bolt hole 177B. At 177C the bottom arm connects to frame 176. A lift spring connection plate 178 supports a lift spring 201.

A back gate connecting arm 179 from the frame 176 supports a back door 180 to control grass flow from conditioner rollers.

A tow bar extension 181 that is parallel with towing chassis has a tow bar portion 182 that has 10 degree downward direction from 182A to tow bar 182B, having a hitch 183 providing a tow point for connecting to tractor tow bar with a tow pin. A swing pin 184 from tow bar to towing chassis allows the bar movement from work to travel position 185.

A spring assembly 186 maintains pressure on top conditioning roller.

A steel skid 187 under roller chassis to centre of skid disc prevents fouling under the disc and protects the disc from ground impact.

A chain sprocket 188 driven by the PTO in clock wise direction, powers the roller conditioners, the top roller powered by a chain sprocket 189 via top roller sprocket 192, and the bottom roller via chain sprocket 190 on bottom roller. A chain sprocket 191 is provided to tighten chain, 193 showing direction of rollers.

At 194 there is a top connecting bolt from roller chassis to mower chassis, and at 195 there is a bottom connecting bolt from roller chassis to mower chassis. The top roller may be supported on a resting block 196.

The drive chains are protected by a guard 197 over chains and sprockets, and a front cover guard 198 protects to the front and is made of pressed steel, and in turn supports a front apron 199 made of flexible rubber and canvas.

A hydraulic ram 200 of 200 mm stroke controls mower height, and a spring 201 provides for mower lift and float over uneven ground. The front gear box 202 has a through shaft and right angle drive to power mower gear boxes, the back gear box 202A has a through shaft and right angle drive to power conditioning rollers, the continuity of drive being provided by a splined connecting collar 203, a slip clutch 204 and universal joint 204B on the PTO shaft allowing slip under excessive back loading. The PTO shaft 204A is expandable and comprises and inner and outer tube, and has a plastic cover 205.

At 209 there is illustrated the tow bar in working position 182, and at 210 there is illustrated the tow bar in travelling position 182. At 211 there is a top view of the wheel chassis 166, and at 212 a top view of lift bar 168. At 213 and 213A the relative position of the tyres is apparent. At 214 the position of the back tail gate 180 is shown, at 215 the left side front cover, at 216 the right side front cover, at 217 the centre front cover that can be lifted to look at discs, at 218 the pivot line for centre front cover, and at 219 the right hand end steel cover that can be folded up in travelling non working use.

Figure 13:
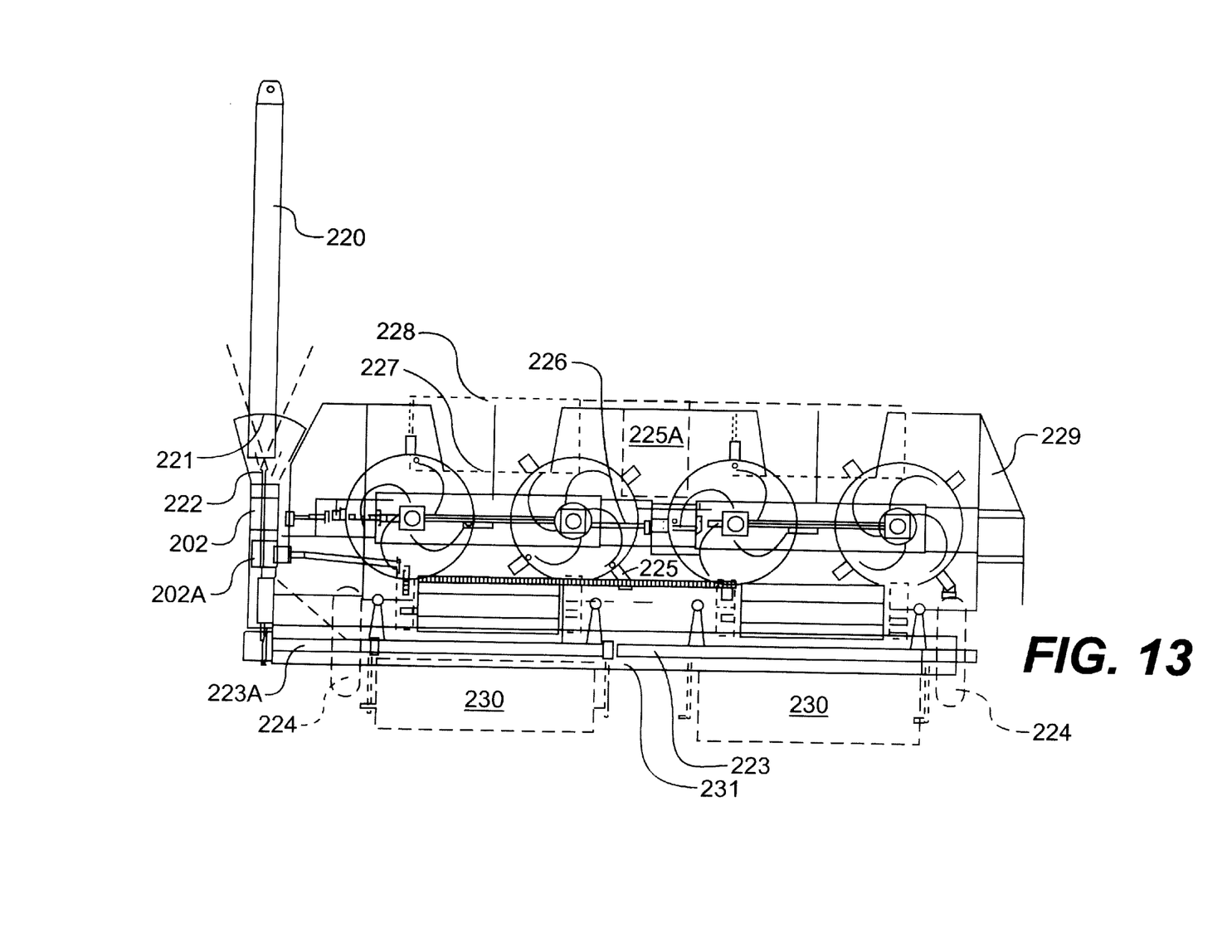
FIG. 13 illustrates a four disc model.
Figure 14:
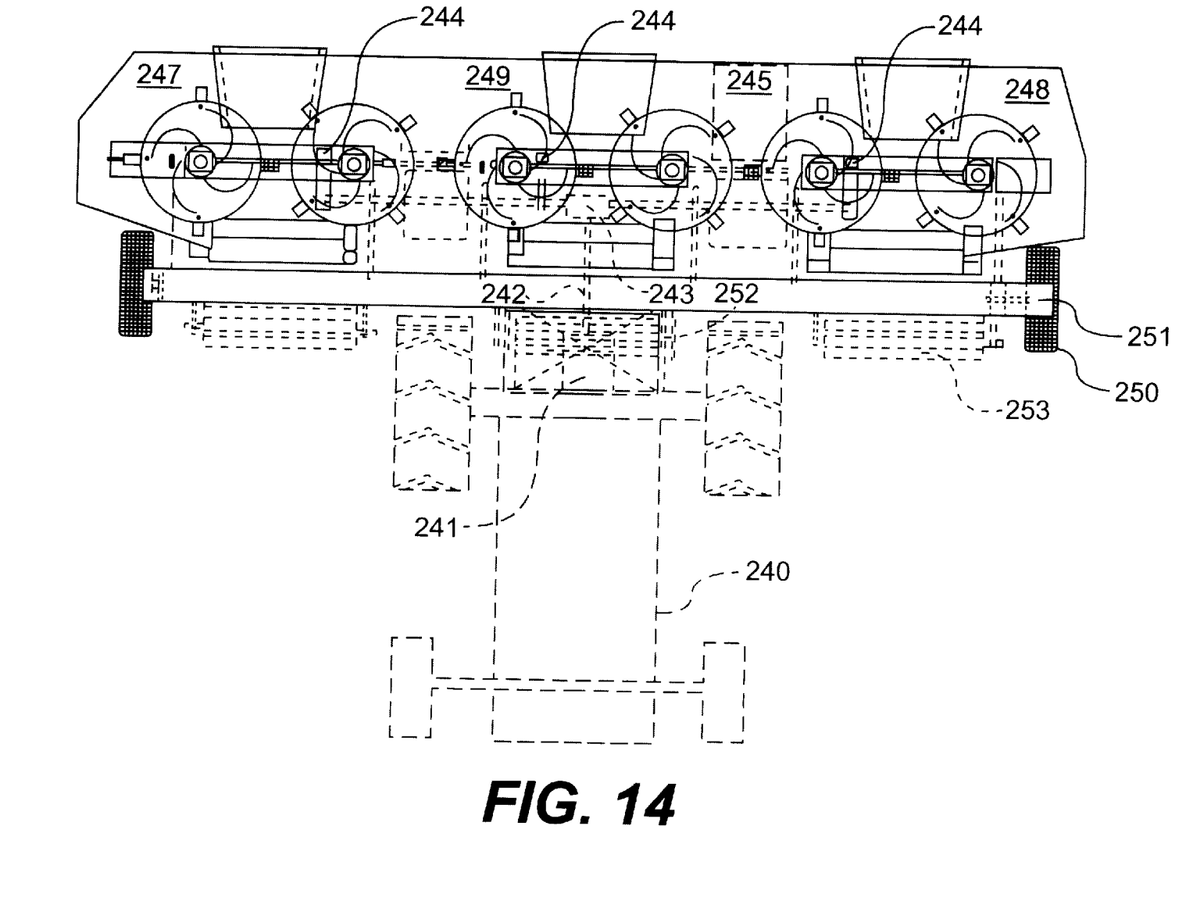
FIG. 14 illustrates a six disc model.

In the four and six disc examples of FIGS. 13 and 14 respectively, at 220 is shown at tow bar that attaches to tractor is longer then two disc model and still pivots from work position to travel. The locking pin 221 for the tow bar and the pin 222 to pivot tow bar are illustrated, as is the lifting bar right hand end 223 and lifting bar left hand end 223A. Tyres 224 of size 10.00 16 are provided. At 225 there is illustrated the cover between the disc units of flexible rubber and canvas, at 225A the front cover between the disc units made of flexible rubber, and at 226 the spacer bar between units. At 227 there is illustrated the pivot point of front cover that can lifted to inspect discs, and at 228 the front rubber apron overlaps the fixed covers. At 229 there is illustrated the end cover which can fold up for travel, and at 230 the back tail gate (one of two). The back wheel chassis 231 is a one piece 5500 mm long 250 mm wide 200 mm high.

In the six disc embodiment 240 of FIG. 14, this apparatus is adapted to be pushed by a tractor. At 240 there is illustrated the tractor PTO at front of tractor, with the PTO shaft 242 from tractor to mower, a right angle gear box 243 with output shaft through the gear box, parallel transfer box 244 to power conditioning rollers and to the disc units, 3 transfer boxes. There is provided a flexible cover 245 between units, a back cover 245A of flexible rubber canvas, an end cover 247 from front to back with outer edge hanging rubber apron to ground, an end cover 248 from front to back with outer edge hanging rubber apron to ground, and a fixed front cover 249 the same as other models. Rubber tyres 250 of size 100..00..16 are provided as before, and the push bar chassis 251 is 6900 mm.

The invention as described in the above embodiments provide for the cutting of grasses and pasture crops in the making of hay which has the advantage of positive and continuous feed of crops between two counter-rotating discs for conditioning between rollers, spoke conditioning flails, forage blower or cut-and-blower, and to windrow crops without attachments and with minimum mincing of crops, on first pass or at headlands. The twin disc system of the present embodiments operate at slower speed than the prior art round discs, with enough speed to keep the cutting knives out to cut cleanly whilst being able to fold back when hitting foreign objects.

There is greatly reduced risk of high speed projectiles. The lifting means of the present embodiments do not tend to cause projectiles to be accelerated due to their trailing shape, making the apparatus safer to operate. The lower speed of operation compared to prior art apparatus also makes balancing of the rotating parts less critical.

The shape of the lifting means creates a continuous feed of crops between the discs to the conditioning rollers or forage blower to allow individual stalks, whether standing or parallel with the ground, to be lifted without being minced and shredded into useless compost.

It will of course be realised that while the above has been given by way of illustrative example of this invention, all such and other modifications and variations thereto as would be apparent to persons skilled in the art are deemed to fall within the broad scope and ambit of this invention as defined in the claims appended hereto.

What is claimed is:

1. Vertical-axis mower and conditioner apparatus including:
   a chassis adapted to be moved over a crop to be mown;
   a plurality of rotary cutter assemblies disposed along said chassis and each comprising a substantially circular body member including a lower wear disc having a circular periphery, said body member supported for driven vertical-axis rotation on said chassis and a plurality of cutting members evenly disposed about the periphery of said body member; and conditioning apparatus adapted to accept crop cut by said cutter assemblies;

said body member of each said cutter assembly includes an upper portion adapted to receive cut crop, said upper portion including a plurality of crop lifting assemblies each being associated with a corresponding cutting member, and each comprising:

a wall portion extending in a curved direction outwardly on said body member from a substantially centrally directed inner end to a substantially circumferentially directed outer end terminating within said periphery, said outer end terminating at a position angularly displaced through an arc of rotation relative to the substantially centrally directed inner end of a next adjacent said wall portion; and a lifting surface having a first portion proximate to a plane of the corresponding cutting member and a second portion in a plane above said plane of said cutting member, said lifting surface being joined to said wall portion along a common edge.

2. Vertical-axis mower and conditioner apparatus according to claim 1, wherein said apparatus includes a drive coupling to receive a power take off of a vehicle adapted to tow said apparatus, said rotary cutter assemblies coupled to the drive coupling for operative rotation.

3. Vertical-axis mower and conditioner apparatus according to claim 1, wherein said cutting member is contoured to assist in delivering the cut crop from said body member to the conditioning apparatus.

4. Vertical-axis mower and conditioner apparatus according to claim 3, wherein said cutting member is inclined such that a leading edge is lower than a trailing edge to contribute to lifting of the cut crop.

5. Vertical-axis mower and conditioner apparatus according to claim 1, wherein said plurality of lifting assemblies are disposed at equal angles about said substantially circular body member.

6. Vertical-axis mower and conditioner apparatus according to claim 5, wherein said lifting assemblies number four.

7. Vertical-axis mower and conditioner apparatus according to claim 1, wherein upper edges of said wall portions are inclined from their inner end towards a plane of travel of the cutting members.

8. Vertical-axis mower and conditioner apparatus in accordance with claim 1, wherein said lifting surface extends from an upper edge of said wall portion towards a plane of the cutting member and terminates at a foot of an adjacent wall portion.

9. Vertical-axis mower and conditioner apparatus according to claim 1, wherein said conditioning apparatus comprises conditioning flails or conditioning rollers.

10. Vertical-axis mower and conditioner apparatus according to claim 1, wherein said crop conditioning apparatus comprises a supporting body, conditioning rollers mounted on said body having a nip to receive cut feed, and drive means for said rollers, wherein said rollers comprise at least one roller with a plurality of substantially evenly spaced ribs, each rib extending between the ends of the roller and curving about a cylindrical roller surface to a mid-point disposed in trailing relation relative to the rib's ends.

11. Vertical-axis mower and conditioner apparatus according to claim 10, wherein said conditioning rollers comprise a pair of conditioning rollers mounted for rotation about horizontal axes mutually contained in an inclined plane such that operatively a receiving side of the nip accepts upwardly lifted cut crop from said rotary cutter assemblies into said nip and discharges conditioned crop from the rollers in a direction having an upward component.

12. Vertical-axis mower and conditioner apparatus according to claim 11, wherein said apparatus includes a drive coupling to receive a power take off of a vehicle adapted to tow said apparatus, said rollers coupled to the drive coupling for operative rotation.

13. Vertical-axis mower and conditioner apparatus according to claim 11, wherein a declination of the ribs about a center to the ends of the roller in the direction of rotation is maintained at an angle of about 25 degrees to a line on the roller parallel to the roller's axis at the point of measurement and follows the curve of the roller to each end.

14. Vertical-axis mower and conditioner apparatus according to claim 11, wherein one roller of said pair is ribbed and the other of said pair is plain, the plain roller having a steel carcass and an outer cover of reinforced rubber.

15. Vertical-axis mower and conditioner apparatus according to claim 1 wherein said wall portion curves from said inner end to said outer end substantially as an involute of a circle.

16. Vertical-axis mower and conditioner apparatus according to claim 1 wherein said wall portion curves from said inner end to said outer end substantially helically.

* * * * *